United States Patent
Cambron et al.

(10) Patent No.: US 11,884,014 B2
(45) Date of Patent: Jan. 30, 2024

(54) TOOL FOR DISPENSING MULTIPLE MATERIALS WITH DISCRETE POSITIONAL CONTROL WITHOUT NEED FOR SEQUENTIAL TOOL CHANGE

(71) Applicant: Advanced Solutions Life Sciences, LLC, Louisville, KY (US)

(72) Inventors: Scott Douglas Cambron, Louisville, KY (US); Kyle Eli, Louisville, KY (US)

(73) Assignee: Advanced Solutions Life Sciences, LLC, Louisville, KY (US)

( * ) Notice: Subject to any disclaimer, the term of this patent is extended or adjusted under 35 U.S.C. 154(b) by 0 days.

(21) Appl. No.: 18/061,747

(22) Filed: Dec. 5, 2022

(65) Prior Publication Data
US 2023/0099465 A1   Mar. 30, 2023

Related U.S. Application Data

(62) Division of application No. 16/906,156, filed on Jun. 19, 2020, now Pat. No. 11,541,597.

(60) Provisional application No. 62/863,499, filed on Jun. 19, 2019.

(51) Int. Cl.
| | |
|---|---|
| B29C 64/209 | (2017.01) |
| B29C 64/118 | (2017.01) |
| B29C 64/336 | (2017.01) |
| B33Y 30/00 | (2015.01) |
| B33Y 10/00 | (2015.01) |
| B33Y 40/00 | (2020.01) |

(52) U.S. Cl.
CPC .......... *B29C 64/209* (2017.08); *B29C 64/118* (2017.08); *B29C 64/336* (2017.08); *B33Y 10/00* (2014.12); *B33Y 30/00* (2014.12); *B33Y 40/00* (2014.12)

(58) Field of Classification Search
CPC ... B29C 64/209; B29C 64/118; B29C 64/336; B29C 64/259; B33Y 30/00
See application file for complete search history.

(56) References Cited

U.S. PATENT DOCUMENTS

| | | |
|---|---|---|
| 9,910,935 B2 | 3/2018 | Golway et al. |
| 2006/0156978 A1 | 7/2006 | Lipson et al. |
| 2015/0105891 A1 | 4/2015 | Golway et al. |

(Continued)

FOREIGN PATENT DOCUMENTS

CN   105835362 A   8/2016

OTHER PUBLICATIONS

International Search Report and Written Opinion for Corresponding PCT/US2020/038623 dated Sep. 18, 2020.

*Primary Examiner* — Joseph S Del Sole
*Assistant Examiner* — Mohamed K Ahmed Ali
(74) *Attorney, Agent, or Firm* — Dinsmore & Shohl LLP

(57) ABSTRACT

A method for operating the 3D printing tool includes positioning a first material distribution barrel within a first barrel orifice, where a first barrel tip is disposed at a first end of the first material distribution barrel. The method further includes positioning a second material distribution barrel within a second barrel orifice, where a second barrel tip is disposed at a first end of the second material distribution barrel. The method further includes dispensing building material from the first material distribution barrel when the first material distribution barrel is substantially vertically oriented and a second material distribution barrel is oriented at an angle from the vertical.

11 Claims, 7 Drawing Sheets

(56) References Cited

U.S. PATENT DOCUMENTS

| | | |
|---|---|---|
| 2015/0140147 A1 | 5/2015 | Konstantinos et al. |
| 2016/0101631 A1 | 4/2016 | Dumenil et al. |
| 2016/0136885 A1 | 5/2016 | Nielsen-Cole et al. |
| 2017/0335271 A1 | 11/2017 | Maggiore |
| 2018/0099453 A1 | 4/2018 | Cambron |
| 2018/0144070 A1 | 5/2018 | Golway et al. |
| 2019/0232553 A1 | 8/2019 | Lakshman et al. |
| 2019/0351617 A1 | 11/2019 | Heston et al. |

TOOL FOR DISPENSING MULTIPLE MATERIALS WITH DISCRETE POSITIONAL CONTROL WITHOUT NEED FOR SEQUENTIAL TOOL CHANGE

CROSS-REFERENCE TO RELATED APPLICATIONS

This application is a divisional application of U.S. patent application Ser. No. 16/906,156 filed Jun. 19, 2020, which claims the benefit of U.S. Provisional Application Ser. No. 62/863,499 filed Jun. 19, 2019, the entire disclosures of which are incorporated herein by reference.

TECHNICAL FIELD

Embodiments of the present disclosure generally relate to 3D printing tools and assemblies and, more specifically, to 3D printing tools and assemblies for dispensing multiple materials and methods for using the same.

BACKGROUND

Additive manufacturing apparatuses may be utilized to build an object from building material, such as organic or inorganic powders, in a layer-wise manner. Tissue engineering via 3D biomaterial dispenser-based precision deposition, in particular, is a fast-evolving technology that has gone from provocative science fiction to the realization of 3D bioprinted functional organ slivers in just a little over a decade. For simplicity, as used herein "bio-printing" refers broadly to any biomaterial dispensing technology utilizing three-dimensional, precise deposition of biomaterials via methodology that is compatible with an automated, computer-aided, three-dimensional prototyping device (a bio-printer). The rapid growth in the 3D tissue engineering industry is in large part due to a demand for transplantable organs and organ repair tissues that is increasing at a faster rate than the supply. Hence, the prospect for urgent timeframe, large volume fabrication of synthetic biological constructs, including functional tissues and organs, has widespread appeal and has achieved significant private and government resource commitment.

SUMMARY

Conventional bioprinters rely on a single nozzle to dispense materials and are therefore limited to dispensing the material present in the nozzle, thereby resulting in build support complications and other build challenges in multi-tissue constructs. In order to dispense a different material, the nozzle must be changed out and replaced. Therefore, one issue of scaling such 3D printing tools and assemblies to commercial production is improving the throughput of additive manufacturing apparatuses to meet commercial demands. Specifically, current capabilities of multi-material prints entail the sequential loading of multiple separate tools with the desired materials to print. These separate tools are placed in a bioprinting device on separate bays. In order to complete the print, the bioprinter must continue to change between the plurality of prescribed tools. Between each tool/material change there is a tip detect action that must be performed to ensure and determine the location of the dispensing tip at the end of the active tool. This continual changing of the tools/materials and tip detections adds time to the overall printing workflow. In some cases, the time required for tool change/tip detection is enough to degrade and/or crosslink biomaterials such that a multi-material print may be compromised and potentially expensive and time sensitive material may be wasted.

Accordingly, a need exists for alternative 3D printing tools, assemblies, and components thereof that improve manufacturing throughput. The implementation of the proposed multi-material tool removes the tool change/tip detect time delays by disposing multiple dispensing chambers on a single tool that only requires a single tip detection action prior to the start of the printing workflow process.

In accordance with one embodiment of the present disclosure, a 3D printing tool and assembly for dispensing multiple materials is disclosed. The 3D printing tool and assembly includes a barrel holder assembly having at least two barrel orifices extending from a top end of the barrel holder assembly through to a bottom end of the barrel holder assembly, wherein at least one of the at least two barrel orifices is oriented at an angle from the vertical within the barrel holder assembly.

In another embodiment of the present disclosure, a method for operating a 3D printing tool and assembly for dispensing multiple materials is provided. The process includes positioning a first material distribution barrel within a first barrel orifice of a barrel holder assembly of the 3D printing tool, wherein: the first barrel orifice extends from a top end of the barrel holder assembly through to a bottom end of the barrel holder assembly, the first material distribution barrels have a first barrel tip disposed at a first end of the first material distribution barrel positioned proximate to the bottom end of the barrel holder, and the first material distribution barrel comprises building material; positioning a second material distribution barrel within a second barrel orifice of the barrel holder assembly, wherein: the second barrel orifice extends from the top end of the barrel holder assembly through to the bottom end of the barrel holder assembly, the second material distribution barrels has a second barrel tip disposed at a first end of the second material distribution barrel positioned proximate to the bottom end of the barrel holder, and the second material distribution barrel comprises building material; orienting the first material distribution barrel substantially vertically, wherein when the first material distribution barrel is oriented substantially vertically, the second material distribution barrel is oriented at an angle from the vertical within the barrel holder assembly; and dispensing building material from the first material distribution barrel when the first material distribution barrel is substantially vertically oriented.

BRIEF DESCRIPTION OF THE DRAWINGS

The following detailed description of specific embodiments of the present disclosure can be best understood when read in conjunction with the following drawings, in which.

DETAILED DESCRIPTION

Figure 1:
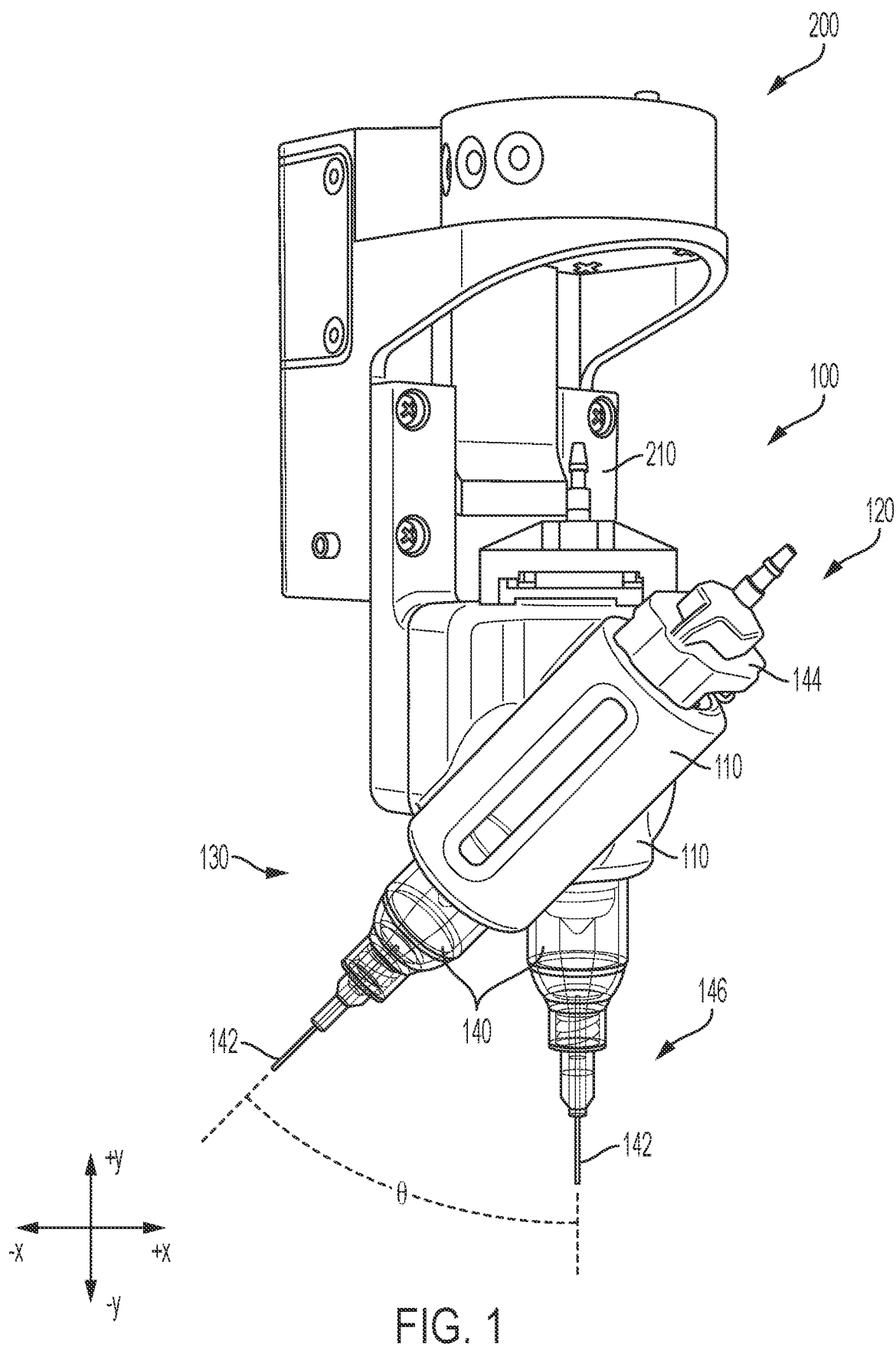
FIG. 1 is an illustrative depiction of a barrel holder assembly, according to the present embodiments.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

As used in this specification and the appended claims, the singular forms "a," "an," and "the" include plural references unless the context clearly dictates otherwise. Any reference to "or" herein is intended to encompass "and/or" unless otherwise stated.

As used herein, "biomaterial" means a liquid, semi-solid, or solid composition comprising a plurality of cells, cell solutions, cell aggregates, multicellular forms or tissues, and in all cases may include support material such as gels, hydrogels, alginate or non-cellular materials that provide specific biomechanical properties that enable biomaterial printing.

As used herein, "cartridge" means any object that is capable of receiving and holding a biomaterial and/or a support material and used interchangeably with "syringe barrel" or "material distribution barrel."

As used herein, "dispensing of biomaterials" may be effectuated by any bioprinting technique including but not limited to inkjet, extrusion/microextrusion, and laser-assisted printing. Thermal inkjet printers electrically heat the printhead to produce air-pressure pulses that force droplets from the nozzle, while acoustic printers use pulses formed by piezoelectric or ultrasound pressure. Extrusion printers typically rely on pneumatic or mechanical (piston or screw) dispensing mechanisms to extrude continuous beads or filaments of biomaterial (or non-biomaterial). Laser-assisted printers use lasers focused on an absorbing substrate to generate pressures that propel cell-containing materials onto the substrate. According to embodiments, the robotically controlled bioprinting of the RBW comprises extrusion dispensing onto a substrate.

A 3D printing tool and assembly for dispensing multiple materials is disclosed and detailed herein. The 3D printing tool and assembly may be integrated into a conventional Robotics BioAssembly Workstation, or RBW, as described herein. The RBW is an integrated workstation comprised of a multi-axis robot and controller, integrated cell and material cartridge containment and dispensing aspect, an environmental control aspect and intelligent visual aspect, configured to provide a compact convenient table-top workstation for bioconstruct assembly needs.

A bioassembly system designs, fabricates and assembles complex three-dimensional biomaterial constructs, including but not limited to cellular systems, tissues, organs, and implantable medical devices and jigs, utilizing the RBW. The RBW aspect comprises a material storage unit including a syringe holder and multiple cartridges (syringe barrels) each with a set of syringes, and a robotic arm component with an end effector capable of gripping, holding, and connecting specialized syringe, and a dispenser. In embodiments, the bioassembly system ultimately achieves CAD-based extrusion dispensing of biomaterials. Suitable materials include but are not limited to biomaterials such as cells, biosupport materials such as gels, and non-biological materials, for example in the design and fabrication of implantable jigs. Combinations of biomaterials, biosupport materials and non-biological materials may be utilized in the same fabrication.

In embodiments, the RBW may further comprise an environmental sensing system including visualization capability, and in some embodiments is capable of providing verification feedback to a user during the assembly process. In some cases assembly may include integration of biological with non-biological constructs.

The RBW allows users to sub-assemble and assemble complex tissue structures and to assemble tissue constructs into higher order biological constructs including organs. According to some embodiments, material cartridges/barrels are loaded manually into the RBW by the user and are placed in the syringe barrel holders. The RBW user-interface may assist the user throughout the process of loading the material cartridges. In specific embodiments the RBW comprises a plurality of syringe barrels containing different materials that can be changed automatically or manually. Other than space constraints, there is no limit to the number of barrels which may be loaded into the RBW for specific uses. In very specific embodiments the RBW comprises between 2 and 12 syringe barrels. In even more specific embodiments the robotic workstation comprises 12 syringe barrels.

The RBW is capable of conducting a change in tooling using an interlocking mechanism of the barrel adapter and an interchangeable component. A material storage system stores the interchangeable components in a fixed orientation when not in use. A gripper temporarily immobilizes the interchangeable component relative to the gripper, while a multi-axis robotic joint (J6) performs a twisting motion of the barrel adapter to lock or unlock the mechanism. The multi-axis robotic joint (or robot arm) may include, for example, a 6-axis (J6) robot arm. When in the locked position, the tool can be used as needed.

A 6-axis (J6) robot arm may include a robot axis 1, robot axis 2, robot axis 3, robot axis 4, robot axis 5, and robot axis 6. Robot axis 1 is located at the robot base and allows the robot to rotate from left to right. This sweeping motion extends the work area to include the area on either side and behind the arm. This axis allows the robot to spin up to a full 180 degree range from the center point. This axis is also known as J1. Robot axis 2 allows the lower arm of the robot to extend forward and backward. It is the axis powering the movement of the entire lower arm. This axis is also known as J2. Robot axis 3 extends the robot's vertical reach. It allows the upper arm to raise and lower. On some articulated models, it allows the upper arm to reach behind the body, further expanding the work envelope. This axis gives the upper arm the better part access. This axis is also known as J3. Robot axis 4 works in conjunction with the axis 5 and aids in the positioning of the end effector and manipulation of the part. Known as the wrist roll, it rotates the upper arm in a circular motion moving parts between horizontal to vertical orientations. This axis is also known as J4. Robot axis 5 allows the wrist of the robot arm to tilt up and down. This axis is responsible for the pitch and yaw motion. The pitch, or bend, motion is up and down, much like opening and closing a box lid. Yaw moves left and right, like a door on hinges. This axis is also known as J5. Robot axis 6 is the wrist of the robot arm. It is responsible for a twisting motion, allowing it to rotate freely in a circular motion, both to position end effectors and to manipulate parts. It is usually capable of more than a 360 degree rotation in either a clockwise or counterclockwise direction. This axis is also known as J6.

To load material cartridges for printing, the user manually loads the filled barrels into the proposed tool. The tool is then manually placed on a tool bay. The robot then can programmatically pickup the proposed tool, take it to the vision tip detect system, perform a tip detect on both barrel tips in a single sequence, and then prep commence to the prescribed printing workflow.

In embodiments, the RBW comprises a closed-loop cartridge dispensing system. Cartridges may comprise any material containment and dispensing article and may be custom-engineered or purchased and contain specific material including specific cell types, biological or non-biological structural support material, and other materials as appropriate/desired for particular assembly applications. A "cartridge" may also be referred to herein as a "syringe barrel" or a "material distribution barrel." The RBW permits loading or retrieval of a specific material/cell cartridge where the user loads the cartridges containing the material/cell types specified in the model into the robotic workstation.

The RBW comprises a tabletop workstation including a multi-axis robot that facilitates 3-D tissue printing of composite volumetric shapes and assembly of biological constructs. In embodiments, the robot may comprise multiple axes, including at least six or more axes of fabrication orientation making it particularly suitable for the level of precision required to assemble functional tissue structures. According to one embodiment, the RBW comprises a multi-axis robot, a robotic controller (in embodiments, the controller may be located outside the RBW housing or may be separately contained within the RBW housing), a frame defining a housing, a print stage, at least one robot end effector, at least one material storage unit, and a unit interface (in embodiments, the RBW-UI may be located outside the RBW housing). In embodiments, the robot comprises an arm having at least a six-axis range of motion. In embodiments, the robot is selected from an EPSON C3 series compact 6-axis robot compatible with a PC based controller and or the EPSON RC180 and RC620+PC based controllers. A frame may comprise one or more of the following features: a Bosch aluminum T-slot, doors, floor, ceiling, roof, paneling, and lighting. A print stage may be constructed of any suitable material and in embodiments, comprises a leveling mechanism. In embodiments, the robot is situated over and above the print stage. A robot end effector comprises one or more of a pneumatic gripper, syringe barrel holder, camera, laser displacement sensor, auto-leveling chuck, and cable management. In embodiments, a material storage unit comprises a syringe holder, displacement sensors and a station mount. The electrical design includes a pneumatic feed line and an electrical power cable. The workstation may be provided in mobile form, for example on a cart.

The RBW User Interface (UI) comprises a status screen which provides the user with information relating to the current state of the workstation. From the status screen a user may, for example, monitor the proper functioning of the RBW's components, such as the controller, dispenser and microcontroller, view a streaming video feed of print jobs, and follow-up on any alarms indicating attention required before proceeding. The RBW-UI further permits a user to make offsets, which is a minor modification made in real-time based on empirical observation. Offsets may be made for pressure, vacuum, speed and Z-height and acceleration values, for example.

Specific embodiments will now be described with references to the figures. Whenever possible, the same reference numerals will be used throughout the drawings to refer to the same or like parts.

FIG. 1 illustratively depicts a 3D printing tool and assembly for dispensing multiple materials including a barrel holder assembly 100 having at least two barrel orifices 110. The barrel orifices 110 extend from a top end 120 of the barrel holder assembly 100 through to a bottom end 130 of the barrel holder assembly 100. Although the barrel holder assembly 100 shown in FIG. 1 depicts two barrel orifices 110, it should be understood that the barrel holder assembly 100 may include greater than two barrel orifices 110, such as three barrel orifices 110, four barrel orifices 110, five barrel orifices 110, up to ten barrel orifices 110, or more. At least one of the barrel orifices 110 is oriented at an angle from the vertical (the +/−Y direction as shown in the directional axes drawn in FIG. 1) within the barrel holder assembly 100. In embodiments, not shown, two of the barrel orifices 110 may be oriented at an angle from the vertical, or, in embodiments including more than two barrel orifices 110, a majority or all of the barrel orifices 110 may be oriented at an angle from the vertical. In embodiments, as shown in FIG. 1, one of the barrel orifices 110 is substantially vertically oriented within the barrel assembly 100.

The 3D printing tool and assembly having the barrel holder assembly 100 shown in FIG. 1 provides the user with a robot end effector that can dispense multiple materials, each with discrete control, from a single tool. Many users implement unique materials/biomaterials that require the use of separate tools to dispense. This unit incorporates but is not limited to barrel adapters to support syringe volumes of varying size, pneumatic inputs for conducting the dispense of respective materials. Embodiments employ barrel orientations making it capable of independently dispensing/printing into all standard height microplates and petri dishes without interfering with the adjacent barrel tip(s) and walls/edges of adjacent wells.

Each of the at least two barrel orifices 110 are disposed at an angle relative to the other within the barrel holder assembly 100, as shown in FIG. 1. In embodiments, the barrel orifices 110 may be disposed at an angle θ relative to each other within the barrel holder assembly, as shown in FIG. 1. For example, the angle θ may be from 1° to 90°, from 1° to 80°, from 1° to 70°, from 1° to 60°, from 1° to 50°, from 1° to 45°, from 1° to 40°, from 1° to 30°, from 1° to 20°, from 1° to 10°, from 10° to 90°, from 10° to 80°, from 10° to 70°, from 10° to 60°, from 10° to 50°, from 10° to 45°, from 10° to 40°, from 10° to 30°, from 10° to 20°, from 20° to 90°, from 20° to 80°, from 20° to 70°, from 20° to 60°, from 20° to 50°, from 20° to 45°, from 20° to 40°, from 20° to 30°, from 30° to 90°, from 30° to 80°, from 30° to 70°, from 30° to 60°, from 30° to 50°, from 30° to 45°, from 30° to 40°, from 40° to 90°, from 40° to 80°, from 40° to 70°, from 40° to 60°, from 40° to 50°, from 40° to 45°, from 45° to 90°, from 45° to 80°, from 45° to 70°, from 45° to 60°, from 45° to 50°, from 50° to 90°, from 50° to 80°, from 50° to 70°, from 50° to 60°, from 60° to 90°, from 60° to 80°, from 60° to 70°, from 70° to 90°, from 70° to 80°, or from 80° to 90°. In embodiments, the angle θ may allow for minimum clearance for microplate/petri dish usage and also maintain enough dexterity with the robotic arm to perform whatever movements are required to reorient the tool to make a distribution barrel 140 normal to the print surface but also allowing enough robot movement to maintain dexterity throughout the entire print.

Figure 5:
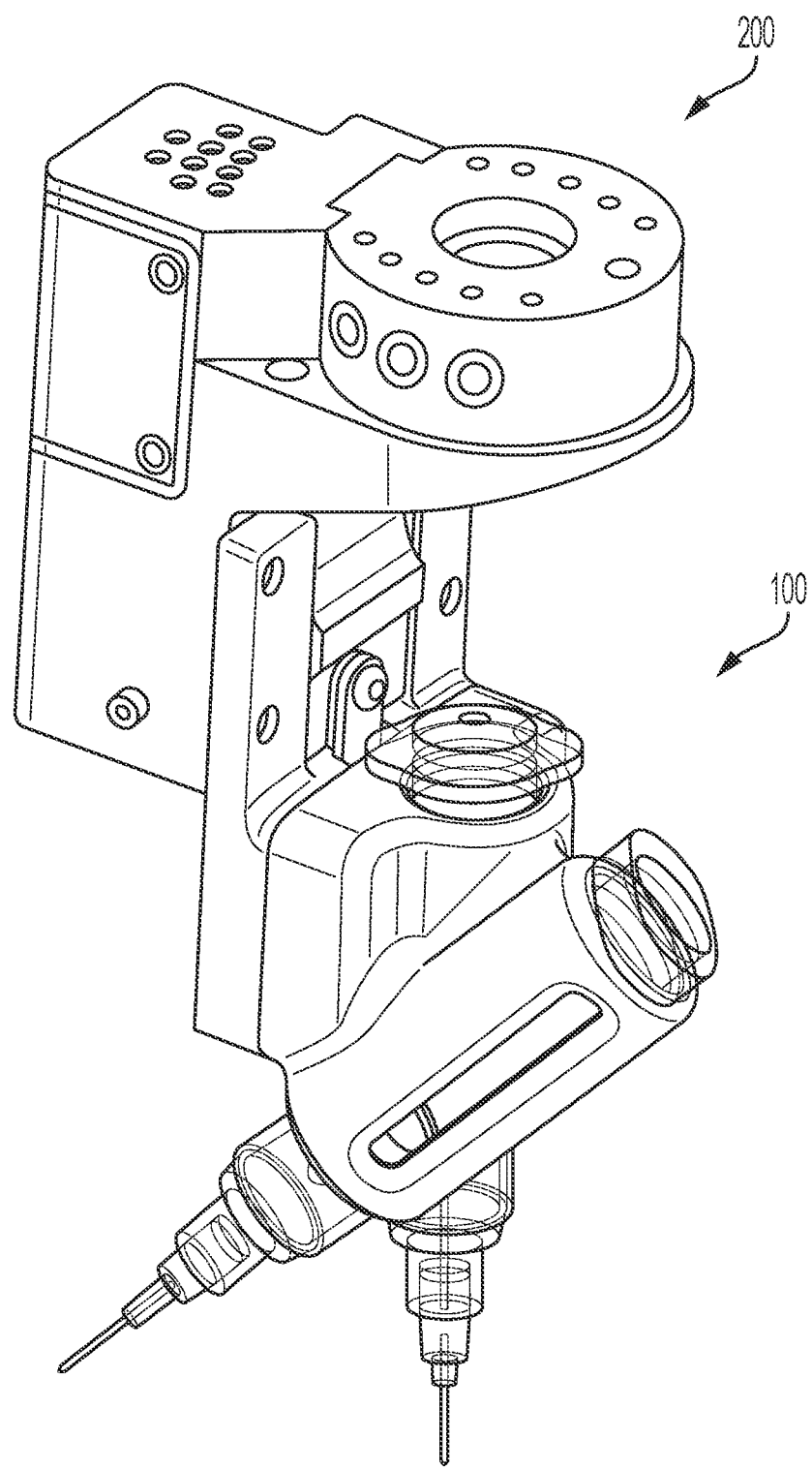
FIG. 5 is an illustrative depiction of a barrel holder assembly, according to the present embodiments.

In embodiments, the 3D printing tool and assembly further includes at least two material distribution barrels 140. As with the barrel orifices 110, it should be understood that although FIG. 1 depicts two material distribution barrels 140, more than two material distribution barrels 140 are contemplated, such that there may be enough material distribution barrels 140 to be positioned in all the barrel orifices 110 present. Each material distribution barrel 140 is removably positioned within the barrel orifices 110. In embodiments, the material distribution barrels 140 may include pneumatic inputs 144 for dispensing building material, as shown in FIG. 1. Alternatively, the material distribution barrels 140 may not include pneumatic inputs, as shown in FIG. 5.

Referring again to FIG. 1, the material distribution barrels 140 each have a barrel tip 142 disposed at a first end 146 of the material distribution barrels 140 positioned proximate to the bottom end 130 of the barrel holder assembly 100. The material distribution barrels 140 may have a material capacity from 1 to 100 cubic centimeters (cc), from 1 to 50 cc, from 1 to 30 cc, from 1 to 20 cc, from 1 to 10 cc, from 1 to 5 cc, from 1 to 3 cc, from 3 to 100 cc, from 3 to 50 cc, from 3 to 30 cc, from 3 to 20 cc, from 3 to 10 cc, from 3 to 5 cc, from 5 to 100 cc, from 5 to 50 cc, from 5 to 30 cc, from 5 to 20 cc, from 5 to 10 cc, from 10 to 100 cc, from 10 to 50 cc, from 10 to 30 cc, from 10 to 20 cc, from 20 to 100 cc, from 20 to 50 cc, from 20 to 30 cc, from 30 to 100 cc, from 30 to 50 cc, or from 50 to 100 cc. In embodiments, the material distribution barrels 140 may have a material capacity of approximately 1 cc, 3 cc, 5 cc, 10 cc, 30 cc, or 50 cc.

In embodiments, the material distribution barrels 140 may include building material, such as genetic material, organic material, biomaterial, organic powder, inorganic powder, metal alloy powder, stainless steel powder, cobalt alloy powder, copper alloy powder, diamond catalyst alloy powder, nickel alloy powder, polymeric compounds, polymeric powder, polymeric resin, elastomeric compounds, elastomeric powder, elastomeric resins, or combinations thereof. In embodiments, the material distribution barrels 140 may each include a different building material.

Figure 2:
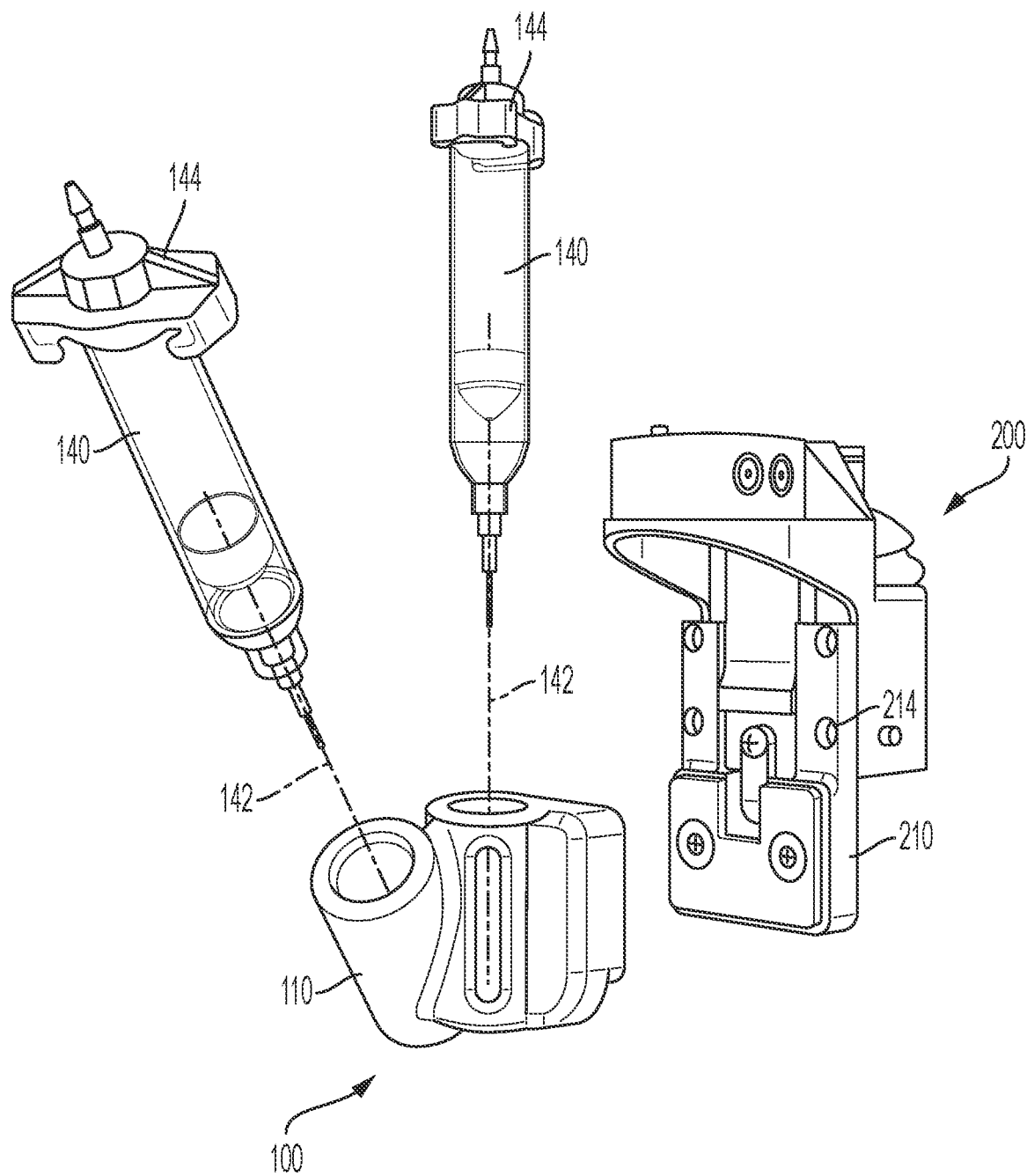
FIG. 2 is an exploded view of an illustrative depiction of a barrel holder assembly, according to the present embodiments.
Figure 3A:
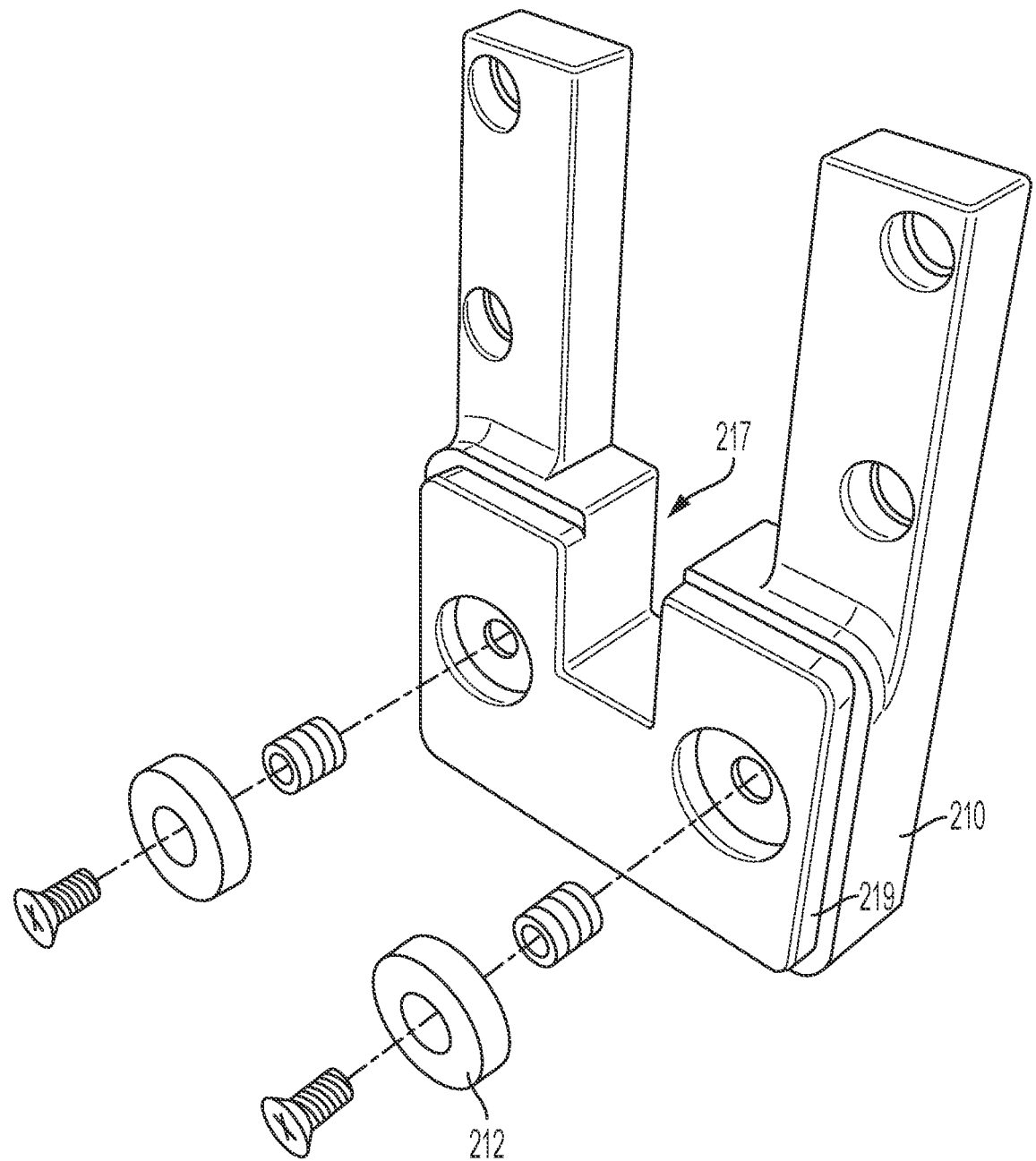
FIG. 3A is an exploded view of an illustrative depiction of a toolbody adapter assembly, according to the present embodiments.
Figure 3B:
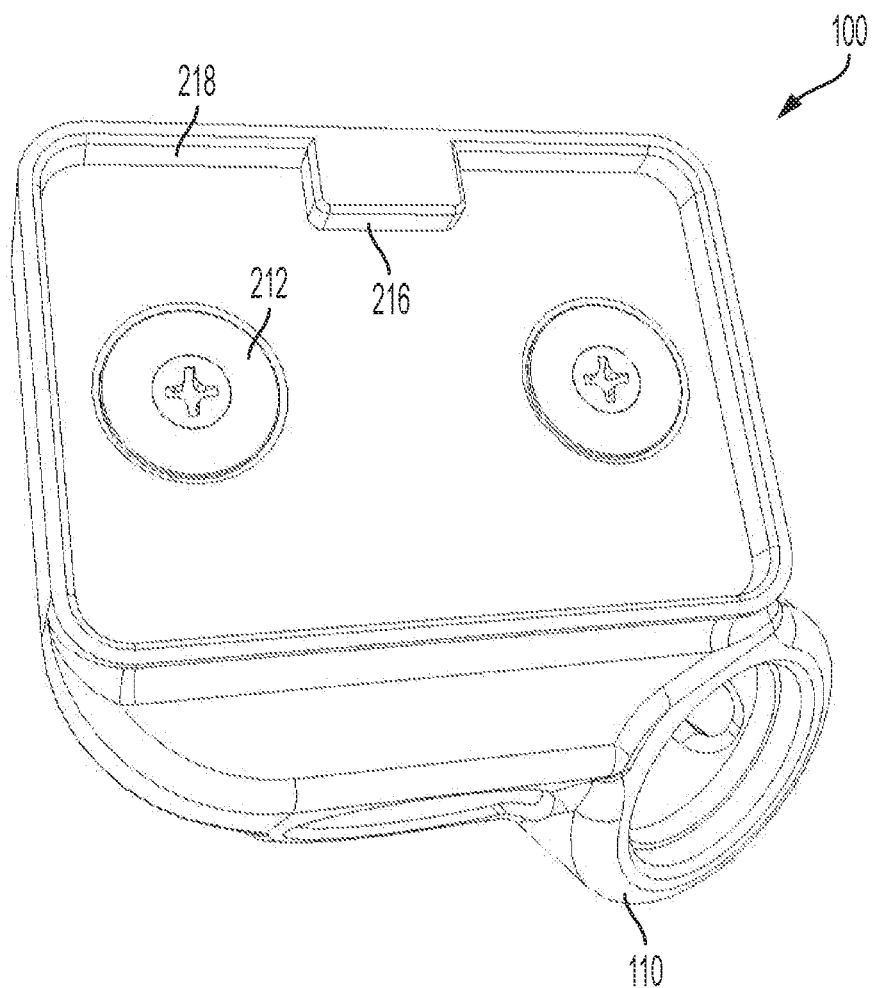
FIG. 3B is an exploded view of an illustrative depiction of a barrel holder assembly, according to the present embodiments.
Figure 4:
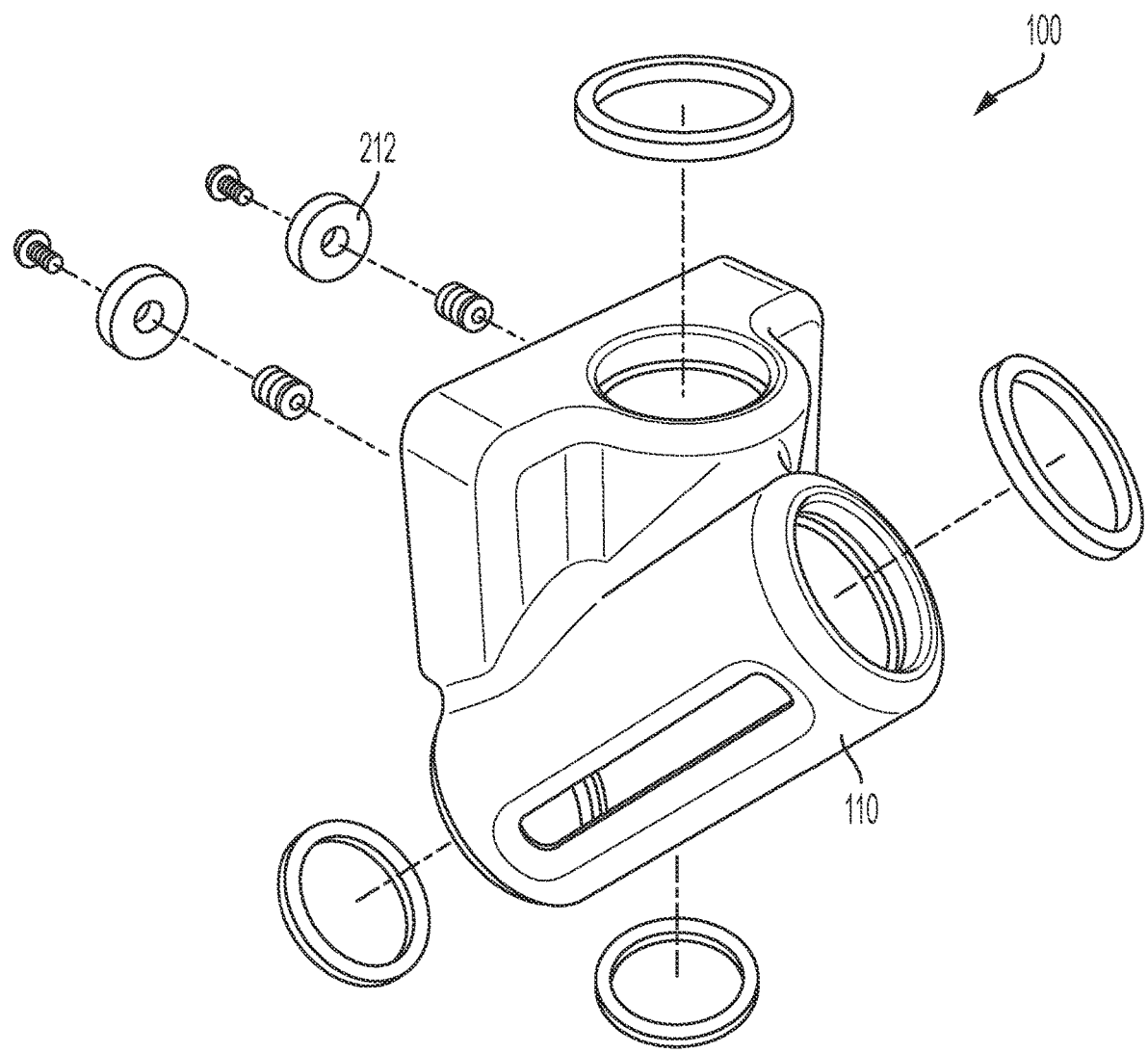
FIG. 4 is an exploded view of an illustrative depiction of a barrel holder assembly, according to the present embodiments.

Referring to FIGS. 1 and 2, the barrel holder assembly 100 may connect to a universal toolbody 200 via a toolbody adapter assembly 210. In embodiments, the toolbody adapter assembly 210 may be connected to the universal toolbody 200 via screws, bolts, or any other suitable mechanical device. In embodiments, the toolbody adapter assembly 210 may be connected to the universal toolbody 200 via bolts 214. In embodiments, as shown in FIGS. 2-4, the barrel holder assembly 100 may magnetically attach to the toolbody adapter assembly 210. The toolbody adapter assembly 210 and the barrel holder assembly 100 may each include a locking magnet 212 to magnetically attach the barrel holder assembly 100 to the universal toolbody 200 via the toolbody adapter assembly 210. The orientation of each locking magnet 212 on the barrel holder assembly 100 and the toolbody adapter assembly 210 may be such that there is an attraction there between the locking magnet 212 on the barrel holder assembly 100 and the locking magnet 212 on the toolbody adapter assembly 210. Additionally or alternatively, there may be indexing features that ensure repeatable positioning and alignment during barrel loading and removal. In embodiments, the locking magnets 212 may include neodymium magnets, Ø½", ⅛" thick, having from 2 to 10 pounds (lbs), from 2 to 8 lbs, from 2 to 6 lbs, from 4 to 10 lbs, from 4 to 8 lbs, from 4 to 6 lbs, from 6 to 10 lbs, from 6 to 8 lbs, or from 8 to 10 lbs of pull per magnet.

In embodiments, there may be indexing features on each mating part to prevent the user from inadvertently mounting the barrel holder assembly 100 in an undesired position or orientation. In embodiments, each mating part may include indexing feature 216, 217 and lip and groove features 218, 219, as shown in FIGS. 3A and 3B. Additionally, it may be desirable to position the material distribution barrels 140 within the barrel orifices 110 when the barrel holder assembly 100 is detached from the universal toolbody 200 and the toolbody adapter assembly 210, and then magnetically attach the barrel holder assembly 100 to the universal toolbody 200 via the toolbody adapter assembly 210 after the material distribution barrels 140 have been positioned within the barrel orifices 110.

Figure 6A:
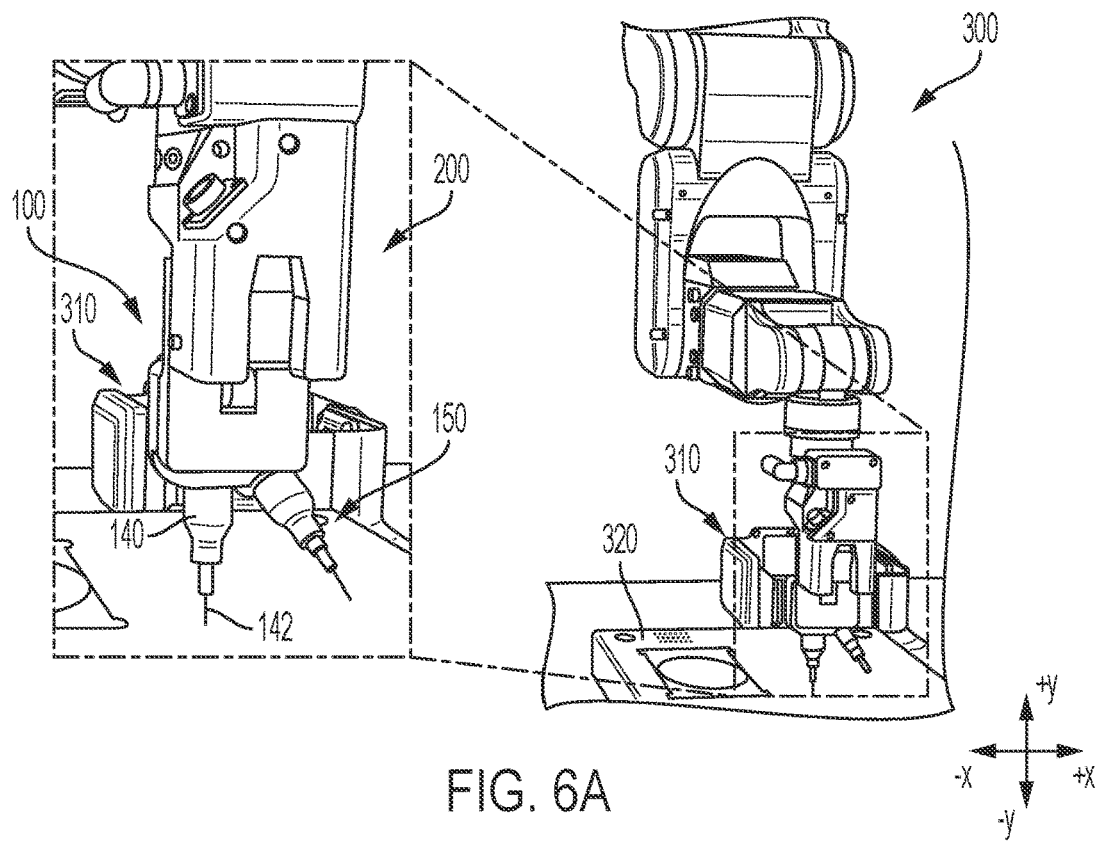
FIG. 6A is an illustrative depiction of a 3D printing tool and assembly for dispensing multiple materials, according to the present embodiments.

A method for operating a 3D printing tool and assembly for dispensing multiple materials is also described herein. The method includes positioning the material distribution barrel 140 within the barrel orifice 110 and positioning at least one more material distribution barrel 140 within at least one more barrel orifice 110, where the material distribution barrels 140 include building material. The method further includes orienting one of the material distribution barrels 140 substantially vertically (i.e. along the +/−Y axis), as shown in FIG. 6A, such that the barrel holder assembly 100 is in the first dispensing position 150. When one of the material distribution barrels 140 is oriented substantially vertically, the other material distribution barrel 140 is oriented at an angle from the vertical within the barrel holder assembly 100, as shown in FIG. 6A.

Figure 6B:
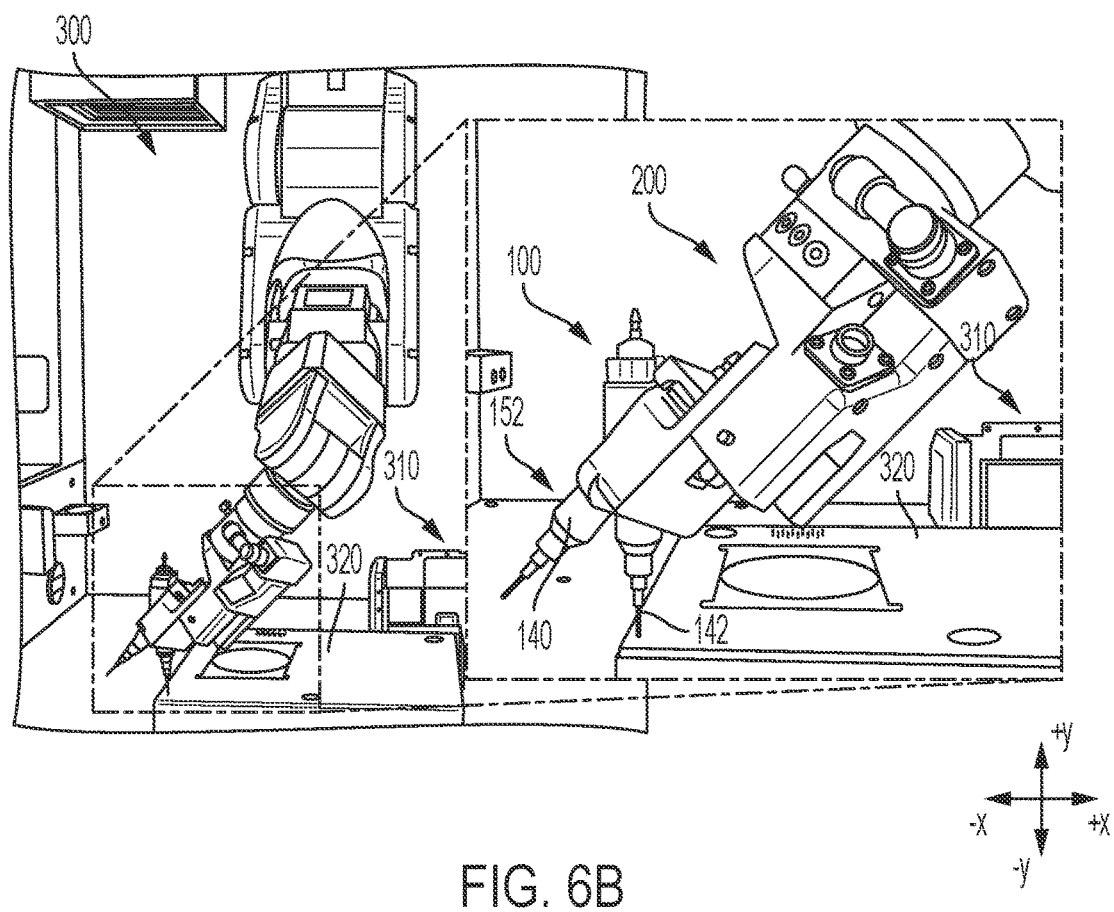
FIG. 6B is an illustrative depiction of a 3D printing tool and assembly for dispensing multiple materials, according to the present embodiments.

In embodiments, the method may include calibrating the position of the barrel tip 142 when the material distribution barrel 140 is vertically oriented. Referring to FIGS. 6A and 6B, the position of the barrel tip 142 may be calibrated by touching the barrel tip 142 to a vision tip detect platform 310. A camera present on the vision tip detect platform 310 (camera not shown) may detect the location of the barrel tip 142 in 3D space. Then, after the camera has determined the location of the barrel tip 142 in 3D space due to touching the barrel tip 142 to the vision tip detect platform 310, the camera may then be able to determine the exact location of the barrel tip 142 at any time after calibration by analyzing the trajectory of the barrel tip 142 with respect to the movement of the robot arm 300. Additionally, the method may include calibrating the position of all barrel tips 142 (for example, the two barrel tips 142 shown in FIGS. 6A and 6B, though additional barrel tips 142 are contemplated and may be calibrated) before beginning to dispense building material.

The method further includes dispensing building material from the substantially vertically oriented material distribution barrel 140. The building material may be dispensed onto a print stage 320, forming a build.

In embodiments, the method further includes orienting another material distribution barrel 140 substantially vertically (i.e. along the +/−Y axis), as shown in FIG. 6B, such that the barrel holder assembly 100 is in the second dispensing position 152. When one of the material distribution barrels 140 is oriented substantially vertically, the other material distribution barrel 140 is oriented at an angle from the vertical within the barrel holder assembly 100, as shown in FIG. 6B. The method may then include dispensing building material from the substantially vertically oriented material distribution barrel 140, after changing from the first dispensing position 150 to the second dispensing position 152.

In embodiments, operating the 3D printing tool and assembly may only end after switching between the first dispensing position 150 and the second dispensing position 152 at least once. In embodiments, operating the 3D printing tool and assembly may only end after switching between the first dispensing position 150 and the second dispensing position 152 at least once, and dispensing building material from each material distribution barrel 140, when each material distribution barrel 140 is substantially vertically oriented. Switching between the first dispensing position 150 and the second dispensing position 152, or vice versa, may take greater than 2 seconds, less than 1 minute, less than 15 seconds, less than 7 seconds, less than 5 seconds, or less than 4 seconds. In embodiments, switching between the first dispensing position 150 and the second dispensing position 152, or vice versa, may take from 2 to 15 seconds, from 2 to 10 seconds, from 2 to 7 seconds, from 2 to 5 seconds, from 2 to 4 seconds, from 2 to 3 seconds, from 3 to 15 seconds, from 3 to 10 seconds, from 3 to 7 seconds, from 3 to 5 seconds, from 3 to 4 seconds, from 4 to 15 seconds, from 4 to 10 seconds, from 4 to 7 seconds, from 4 to 5 seconds, from 5 to 15 seconds, from 5 to 10 seconds, from 5 to 7 seconds, from 7 to 15 seconds, or from 7 to 10 seconds. Additionally, in embodiments where all barrel tips 142 are calibrated before building material is dispensed, the robot arm 300 may switch quickly between the first dispensing position 150 and the second dispensing position 152 without pausing to recalibrate. Quickly switching between the first dispensing position 150 and the second dispensing position 152 (and possible additional dispensing positions when additional barrel orifices 110 and material distribution barrels 140 are present) decreases tool change/tip detect time delays by having all needed building materials present in a single tool and also removes current issues where enough time can pass between conventional tool change/tip detection duration that building materials can degrade and/or crosslink to a point where the multi-material print has been compromised and the potentially expensive and time sensitive material has been wasted.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout the disclosure, the singular forms "a," "an" and "the" include plural referents unless the context clearly dictates otherwise. Thus, for example, reference to "a" component includes aspects having two or more such components, unless the context clearly indicates otherwise.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method for operating a 3D printing tool and assembly for dispensing multiple materials, the method comprising:
    positioning a first material distribution barrel within a first barrel orifice of a barrel holder assembly of the 3D printing tool, wherein:
        the first barrel orifice extends from a top end of the barrel holder assembly through to a bottom end of the barrel holder assembly,
        the first material distribution barrel has a first barrel tip disposed at a first end of the first material distribution barrel positioned proximate to the bottom end of the barrel holder assembly, and
        the first material distribution barrel comprises building material;
    positioning a second material distribution barrel within a second barrel orifice of the barrel holder assembly, wherein:
        the second barrel orifice extends from the top end of the barrel holder assembly through to the bottom end of the barrel holder assembly,
        the second material distribution barrel has a second barrel tip disposed at a first end of the second material distribution barrel positioned proximate to the bottom end of the barrel holder assembly, and
        the second material distribution barrel comprises building material;
    orienting the first material distribution barrel substantially vertically, wherein when the first material distribution barrel is oriented substantially vertically, the second material distribution barrel is oriented at an angle from the vertical within the barrel holder assembly; and
    dispensing building material from the first material distribution barrel when the first material distribution barrel is substantially vertically oriented.

2. The method of claim 1, further comprising calibrating the position of the first barrel tip when the first material distribution barrel is vertically oriented.

3. The method of claim 1, further comprising orienting the second material distribution barrel substantially vertically, wherein when the second material distribution barrel is oriented substantially vertically the first material distribution barrel is oriented at an angle from the vertical within the barrel holder assembly.

4. The method of claim 3, further comprising calibrating the position of the second barrel tip when the second material distribution barrel is vertically oriented.

5. The method of claim 3, further comprising dispensing building material from the second material distribution barrel when the second material distribution barrel is substantially vertically oriented.

6. The method of claim 3, further comprising ending the operation of the 3D printing tool only after orienting the first material distribution barrel substantially vertically, dispensing building material from the first material distribution barrel, orienting the second material distribution barrel substantially vertically, and dispensing building material from the second material distribution barrel.

7. The method of claim 1, wherein the first barrel orifice and the second barrel orifice are disposed at an angle relative to each other within the barrel holder assembly.

8. The method of claim 7, wherein the first barrel orifice and the second barrel orifice are disposed at an angle of from 1° to 90° relative to the other within the barrel holder assembly.

9. The method of claim 1, wherein the building material comprises genetic material, organic material, biomaterial, organic powder, inorganic powder, metal alloy powder, stainless steel powder, cobalt alloy powder, copper alloy powder, diamond catalyst alloy powder, nickel alloy powder, polymeric compounds, polymeric powder, polymeric resin, elastomeric compounds, elastomeric powder, elastomeric resins, or combinations thereof.

10. The method of claim 9, wherein the first material distribution barrel comprises different building material from the second material distribution barrel.

11. The method of claim 10, further comprising switching between dispensing building material from the first material distribution barrel and dispensing building material from the second material distribution barrel to dispense different building material within less than 1 minute.

\* \* \* \* \*